Patented June 29, 1943

2,323,102

UNITED STATES PATENT OFFICE 2,323,102

PROCESS OF MAINTAINING THE ORIGINAL CHARACTERISTICS OF SUBSTANCES

Milfred Lawson Staples, Toronto, Ontario, Canada, assignor to Ontario Research Foundation, Toronto, Ontario, Canada No Drawing. Application December 16, 1940, Serial No. 370,346

3 Claims. (Cl. 99—135)

This invention relates to a process of maintaining the original characteristics of substances which deteriorate when subjected to uncontrolled variations in humidity of the surrounding atmosphere.

Some products retain their original characteristics in a fully saturated atmosphere or substantially completely dry atmosphere or in an atmosphere either above or below a certain humidity, and the original characteristics of such products can be maintained by storing them in an enclosure containing water, which is adapted to add moisture to the air, or a deliquescent substance, which is adapted to subtract moisture from the air.

Other substances, however, deteriorate if the humidity either increases above or decreases below a certain point. This is true for instance of tobacco, which becomes too moist for smoking and mildews if kept in an atmosphere of high humidity, and becomes inflammable and loses its flavour if it becomes too dry. It is also true of cheese, bread, confectionery and other food products. Moreover, many such substances are not only undesirable if too moist or too dry, but their desirable characteristics cannot be regained by restoring the moisture content to normal. This is particularly true of chewing gum, and the invention will be described with particular reference to chewing gum, although, except in its specific form, it has a much broader application.

A problem which is common to all manufacturers of chewing gum is that of preserving certain desirable properties of the gum from the time it is packaged in the plant until it is sold to the consumer. The moisture content of the gum is in the process of manufacture regulated so that the product will have such texture and plasticity as will make it readily "chewable." Therefore, immediately after manufacture, the gum has a fresh taste, it is flexible and it has the property of readily forming into a "chew." After a period of time many of these properties are lost if the product is stored under ordinary atmospheric conditions. If it is exposed to fairly high humidities such as frequently prevail in the summer time, the gum absorbs moisture and soon becomes "sweated," it darkens in colour, loses its fresh appearance due to the solution of the coating of finely powdered sugar on its surface, and the gum base loses its coherent properties which do not re-develop until after a considerably longer period of chewing than is normally required. When "sweated" gum is dried out again, its original appearance and flavour are not completely recovered. Exposure to low humidities results in a loss of moisture and makes a stick of gum very hard and brittle due to a marked decrease in flexibility. Such dehydration also tends to impart a "flat" taste and the original flavour is not completely recovered when the gum regains its moisture. At the present time many of the manufacturers of chewing gum not only find it necessary to periodically recall from retail stores all gum that remains unsold, but also recognize the fact that the properties of their product when it reaches the consumer are in many cases distinctly inferior to those of fresh gum.

An attempt to solve the problem of retaining flexibility has been made by adding hygroscopic substances to the gum. This practice is followed particularly in winter time production when the gum is more likely to be stored under conditions of low humidity, but is far from being a satisfactory solution. The tendency for the material to absorb moisture is greatly increased and results in larger amounts of "sweated" gum where stock in retail stores is carried over into the summer months.

The object of my inventoin is to provide a method of and means for maintaining within a normal range of temperatures the original characteristics of substances such as chewing gum which deteriorate when subjected to uncontrolled increases and decreases in humidity of the surrounding atmosphere.

As the result of a laboratory study of this problem it was found that the flexibility and other desirable characteristics of a stick of chewing gum depended largely on its moisture content. There appeared, therefore, the possibility that if the material were stored in an atmosphere with which it was in moisture equilibrium, the flexibility, flavour, and freshness could be retained.

The problem then was to ascertain the correctness of this view, and to find means for maintaining the normal moisture conetnt of the gum not only at normal atmospheric or room temperature (approximately 70° F.) but at temperatures considerably higher and lower.

A typical piece of chewing gum with respect to which the following experiments were made consists when fresh of the following ingredients in the substantially following proportions by weight:

| | |
|---|---|
| Gum base | 15% to 25% |
| Sucrose | 50% to 60% |
| Glucose | 15% to 25% |
| Softeners, or fillers | 1% to 5% |
| Flavouring | A fraction of 1% |

And a thin coating or dusting of sugar.

The moisture content of such gum is such that it is in substantial equilibrium in an atmosphere of 55% relative humidity at 70° F. The actual moisture content is difficult to determine. The way in which water may be present in chewing gum is not definitely known. In all probability some water is held by so-called physical forces, but it is also possible that water may be chemically bound, for example as hydrates of the sugars. If a sample of the product is subjected to azeotropic distillation using a low boiling petroleum solvent about 4% of water can be removed. On the other hand, less than half of this amount is removed by storing the gum in an air-tight container over a strong dehydrating agent, such as phosphorus pentoxide. The loss of even this smaller amount of water content causes the gum to become hard and brittle and it is this, or a part of this water content which is lost when gum is stored in a dry atmosphere.

By experiment it was first determined what is the required relative humidity at different temperatures to maintain the moisture equilibrium between the gum and the atmosphere to which it is exposed. It was found that the moisture content of the gum on which its flexibility largely depends, could be maintained the same as when it left the factory by placing it in an atmosphere of approximately 55% relative humidity at a temperature of 21° C. (70° F.). Further experiments at different temperatures showed that as the temperature was reduced the relative humidity of the atmosphere required to keep the moisture content of the gum constant was greater, and vice versa.

The following table gives the optimum required relative humidity at different temperatures as obtained by experimental means:

| Temperature | Relative humidity required | Moisture content of atmosphere |
|---|---|---|
| | Percent | G./liter |
| 10° C., 50° F | 56.8 | 0.0053 |
| 15° C., 59° F | 56.0 | 0.0072 |
| 20° C., 68° F | 55.2 | 0.0095 |
| 25° C., 77° F | 54.5 | 0.0125 |
| 30° C., 86° F | 53.8 | 0.0163 |
| 35° C., 95° F | 53.0 | 0.0210 |

It will be observed that whereas the optimum relative humidity at higher temperatures is less than at lower temperatures the absolute humidity or moisture content of the atmosphere is much greater. It will be understood that the results obtained would vary somewhat depending on the ingredients of the gum and the initial preferred moisture content.

Then the gum was placed within an enclosure in an atmosphere which was in contact with an aqueous solution such that the air in the enclosure was in substantial moisture equilibrium with the gum at normal atmospheric temperatures and such that the relative humidity at all temperatures to which the gum was exposed came as near as possible to the required optimum relative humidity as per the table hereinbefore referred to.

While a solution of sulphuric acid produced fairly satisfactory results at ordinary room temperature (70° F.), it is not suitable at higher or lower temperatures since it does not produce an atmosphere with relative humidity close enough to the optimum relative humidity required.

I found, however that saturated solutions of certain salts such as magnesium nitrate hexahydrate, nickel chloride hexahydrate, manganese chloride tetrahydrate, and to a lesser degree calcium nitrate tetrahydrate, do come closely enough to providing the relative humidity required at the range of temperatures to which the gum is normally subjected and may be satisfactorily employed.

The three first mentioned salts it will be seen from the following table, approximate very closely to the relative humidities required at the different temperatures tabled above.

| Temperature | Magnesium nitrate relative humidity obtained | Nickel chloride relative humidity obtained | Manganese chloride relative humidity obtained |
|---|---|---|---|
| | Percent | Percent | Percent |
| 10° C., 50° F | 56.5 | 57.0 | |
| 15° C., 59° F | 55.4 | 56.5 | 56.5 |
| 20° C., 68° F | 54.2 | 55.5 | 54.2 |
| 25° C., 77° F | 52.7 | 53.0 | 54.0 |
| 30° C., 86° F | 51.2 | 52.0 | 53.4 |
| 35° C., 95° F | 49.8 | 51.0 | 52.2 |

Calcium nitrate tetrahydrate gives satisfactory results at temperatures at or below room temperature. At temperatures of 90° F. or higher the relative humidity obtained is too low to be satisfactory.

The above are only examples of solutions of salts which can be used to humidify the atmosphere, and aqueous solutions of other substances which may be found to approximate the required characteristics might be employed, such as other salts or mixtures of salts, or other chemical reagents which in solution produce the required or nearly the required relative humidity at the different temperatures to which the gum is likely to be subjected. The suitability of other substances for the purpose desired may be determined by a knowledge of their physical characteristics or by simple experiment. It would be difficult, if not impossible, and unnecessary, to determine and set down all substances which might be used. The chemical substances used must be stable at the temperatures indicated and must not, in any event, give off noxious fumes.

It has been found that the results obtained will not be materially affected if the relative humidity at the higher temperatures is 2% to 3% less than the optimum. However, if the relative humidity is decreased further, experiment has shown that the gum soon begins to lose its flexibility and if the humidity drops still further not only does the product become hard and brittle but its flavouring is soon impaired. On the other hand even a slight increase in the relative humidity above the optimum, at the higher temperatures, dissolves the dusting of sugar on the surface of the stick thus destroying its fresh appearance, and also adversely affects its chewing qualities.

At lower temperatures experiment has shown that if the relative humidity is appreciably less than the optimum the gum becomes hard and unpleasant to chew. If it is greater than the optimum the product soon becomes "sweated." If the relative humidity is kept constant at 55% despite variations in temperature, experiment has shown that the flexibility of the gum is less than is desirable at lower than ordinary room temperature while at higher temperatures the sugar coating on the surface disappears and the gum becomes soggy. Except at the higher temperatures, the amount of variation in relative humidity that is permissible from the optimum specified, is quite small. It will be understood that both the temporary and permanent effects of too much or too little humidity are somewhat intangible and depend largely on personal taste and the extent and time of departure from the optimum.

When solutions of salts are employed the solutes will be in excess of the water required for forming a saturated solution so that if surplus moisture creeps into the container from without it will be absorbed by the excess solutes. On the other hand, if moisture is lost from the container some solute is precipitated and the solution remains saturated.

While it is desirable that the container in which the gum is exposed to the modified atmosphere should be reasonably airtight, it is not necessary to have it completely so, as the solution of the salts employed readily overcomes the effects of the infiltration of outside air which is not in moisture equilibrium with the gum. Opening of the container for the time required to remove some of the contents will, if the humidity of the external atmosphere is different from that of the enclosure, affect the humidity of the closure but this will soon be corrected by the action of the solution.

Samples of gum have been stored over solutions of magnesium nitrate hexahydrate, nickel chloride hexahydrate and manganese chloride tetrahydrate for periods of several months and the behavior of the material carefully observed. It was found practically impossible to distinguish the appearance, flavour and chewing qualities of fresh gum (in the condition it leaves the manufacturer) from that which had been under storage conditions in accordance with my process.

The gum as it leaves the factory may contain a slight excess or deficiency of moisture, which condition will be quickly corrected if the gum is placed in an enclosure the humidity of which is controlled in accordance with this invention.

While saturated humidifying solutions with an excess of solute are preferred, unsaturated solutions having the required characteristics could be used. However, an unsaturated solution would not be as satisfactory as a saturated solution, since its strength would vary if outside air of different relative humidity was admitted to the enclosure and it would also vary from giving up moisture to the gum or absorbing moisture from the gum.

The enclosure for the substance may be of any suitable substantially air-tight construction. The solution may be contained in an open container in the enclosure. Means of access would be provided for replenishing the solution and for inserting and removing the material to be stored therein. The means of access would preferably be an opening no larger than required for the purpose and provided with a closure capable of being quickly opened and closed so as to avoid as much as possible any change of atmosphere in the enclosure. An ordinary gum dispensing slot machine may be readily adapted for the purpose. Special containers for store or home use may be provided for storing and/or dispensing gum, bakery products and other substances. The specific apparatus for storing and dispensing such substances may obviously take many forms and does not form part of this invention.

While the invention has been described particularly with reference to chewing gum, it is obvious that in its broader aspect it is applicable to any substance which deteriorates when stored in an atmosphere in which the humidity is either above or below a predetermined level. Different solutions from those found applicable to chewing gum would be required for use with substances where the optimum humidity differed from the optimum humidity for chewing gum.

I claim:

1. The process of maintaining the original freshness of chewing gum, which consists in maintaining the moisture content of the gum substantially constant by storing it in a substantially air-tight enclosure, and exposing the atmosphere in said enclosure to a saturated aqueous solution of a metallic salt which does not give off noxious fumes and which has the characteristic of maintaining the atmosphere in substantial moisture equilibrium with the gum within a normal range of temperatures by increasing the moisture content of the atmosphere at higher temperatures and reducing the moisture content of the atmosphere at lower temperatures.

2. The process of maintaining the original freshness of chewing gum, which consists in maintaining the moisture content of the gum substantially constant by storing it in a substantially air-tight enclosure, and exposing the atmosphere in said enclosure to a saturated aqueous solution of a metallic salt chosen from the group comprising magnesium nitrate hexahydrate, calcium nitrate tetrahydrate, manganese chloride tetrahydrate, and nickel chloride hexahydrate, which does not give off noxious fumes and which has the characteristic of maintaining the atmosphere in substantial moisture equilibrium with the gum within a normal range of temperatures by increasing the moisture content of the atmosphere at higher temperatures and reducing the moisture content of the atmosphere at lower temperatures.

3. The process of maintaining the original freshness of chewing gum, which consists in maintaining the moisture content of the gum substantially constant by storing it in a substantially air-tight enclosure, and exposing the atmosphere in said enclosure to a saturated aqueous solution of a metallic salt chosen from the group comprising magnesium nitrate hexahydrate, calcium nitrate tetrahydrate, manganese chloride tetrahydrate, and nickel chloride hexahydrate, which does not give off noxious fumes and which has the characteristic of maintaining the atmosphere in substantial moisture equilibrium with the gum within a normal range of temperatures by increasing the moisture content of the atmosphere at higher temperatures and reducing the moisture content of the atmosphere at lower temperatures, the solution having an excess of solute.

MILFRED L. STAPLES.